(12) United States Patent
Foroutanaliabad et al.

(10) Patent No.: US 7,695,750 B2
(45) Date of Patent: Apr. 13, 2010

(54) METHODS FOR SPLITTING PISTACHIO NUTS

(76) Inventors: Ahmad Foroutanaliabad, Zymex Industries, Inc., 16720 Ave. 17 1/2, Madera, CA (US) 93637; Anahita Foroutanaliabad, Zymex Industries, Inc., 16720 Ave. 17 1/2, Madera, CA (US) 93637

( * ) Notice: Subject to any disclaimer, the term of this patent is extended or adjusted under 35 U.S.C. 154(b) by 235 days.

(21) Appl. No.: 11/903,218

(22) Filed: Sep. 21, 2007

(65) Prior Publication Data
US 2008/0020108 A1 Jan. 24, 2008

Related U.S. Application Data

(63) Continuation of application No. 11/060,700, filed on Feb. 16, 2005, now Pat. No. 7,357,952.

(51) Int. Cl.
A23L 1/36 (2006.01)
(52) U.S. Cl. .................. 426/632; 426/444; 426/506; 426/524; 62/63; 62/64
(58) Field of Classification Search .......... 426/312, 426/319, 629, 632, 443–444, 506–511, 524; 99/472, 516, 517, 571, 534–536, 567–568; 62/1, 62–64
See application file for complete search history.

(56) References Cited

U.S. PATENT DOCUMENTS

| | | | | |
|---|---|---|---|---|
| 2,234,157 | A | * | 3/1941 | Jones .................. 426/482 |
| 2,259,939 | A | | 10/1941 | Garcia |
| 2,278,467 | A | * | 4/1942 | Musher ............... 426/632 |
| 2,318,265 | A | | 5/1943 | Stagmeier |
| 2,590,542 | A | * | 3/1952 | Jones .................. 252/67 |
| 2,601,421 | A | | 6/1952 | Thaning |
| 2,995,166 | A | | 8/1961 | Burley et al. |
| 3,022,807 | A | * | 2/1962 | Bloch .................. 426/460 |
| 3,413,818 | A | * | 12/1968 | Pelmulder ............. 62/63 |
| 3,687,180 | A | * | 8/1972 | Michalon ............. 241/33 |
| 4,018,908 | A | | 4/1977 | Gross |
| 4,183,967 | A | | 1/1980 | Nelson et al. |
| 4,321,865 | A | | 3/1982 | Ramseier |
| 4,340,611 | A | | 7/1982 | McKinney et al. |
| 4,432,275 | A | | 2/1984 | Zekert et al. |
| 4,436,757 | A | | 3/1984 | Lange et al. |
| 4,462,156 | A | | 7/1984 | Himelhoch |
| 4,515,076 | A | | 5/1985 | Reznik |
| 4,742,686 | A | | 5/1988 | Cook |
| 4,773,323 | A | | 9/1988 | Frasch |
| 4,805,527 | A | | 2/1989 | Yoshihara |
| 4,818,550 | A | | 4/1989 | Davidson |
| 4,909,140 | A | | 3/1990 | Burlock et al. |
| 4,961,947 | A | | 10/1990 | Burlock et al. |
| 4,980,188 | A | | 12/1990 | Burlock et al. |
| 4,996,917 | A | | 3/1991 | Burlock et al. |
| 5,043,005 | A | | 8/1991 | Keller et al. |
| 5,192,356 | A | | 3/1993 | Keller |
| 5,247,879 | A | | 9/1993 | Frederiksen et al. |
| 5,303,470 | A | | 4/1994 | Wakelam |
| 5,329,845 | A | | 7/1994 | Bichel |
| 5,511,470 | A | | 4/1996 | Lemos |
| 5,703,784 | A | | 12/1997 | Pearson |
| 5,711,212 | A | | 1/1998 | Lemos |
| 5,738,894 | A | | 4/1998 | Prendiville |
| 6,009,799 | A | | 1/2000 | Lemos |
| 6,125,743 | A | | 10/2000 | McIntyre |
| 6,224,932 | B1 | * | 5/2001 | Stahmann et al. ......... 426/479 |
| 6,284,300 | B1 | | 9/2001 | Prendiville et al. |
| 6,378,213 | B1 | | 4/2002 | Griffith |
| 6,527,124 | B1 | | 3/2003 | Nakhei-Nejad |
| 6,541,725 | B2 | | 4/2003 | Pearson |
| 6,609,303 | B2 | | 8/2003 | Rogel |
| 6,634,283 | B2 | | 10/2003 | Prendiville et al. |
| 7,368,140 | B2 | * | 5/2008 | Tabata .................. 426/482 |

(Continued)

FOREIGN PATENT DOCUMENTS

CN 95113961.4 6/1996

(Continued)

*Primary Examiner*—Drew E Becker
(74) *Attorney, Agent, or Firm*—Mark D. Miller; Marcus N. DiBuduo

(57) ABSTRACT

The present invention discloses methods for artificially splitting nuts in a manner that ensures that the nuts split in the same manner as naturally split nuts. The methods include placing a batch of closed-shell nuts into a water filled vessel, sealing it, and reducing the pressure inside the vessel by removing air. This also causes air to be removed from inside the nuts. The air pressure in the vessel is then normalized, causing the air removed from the nuts to be replaced with water from the vessel. The nuts are then promptly transferred from the vessel and exposed to forces that cause the water inside the nuts to rapidly expand, creating internal pressure that forces the shells to split open along the longitudinal suture of the nut. The internal pressure can be created by the application of microwave radiation on the nut, thereby turning the water within the nut into water vapor, or by subjecting the nuts to a rapid decrease in temperature, thereby causing the water within the nuts to freeze and creating the internal pressure required to split open the shell of the nut. An alternative embodiment provides methods for completely splitting partially-split nut shells.

51 Claims, No Drawings

U.S. PATENT DOCUMENTS

2002/0031584 A1  3/2002  Legge Prendiville et al.
2003/0233948 A1  12/2003  Trujillo

FOREIGN PATENT DOCUMENTS

| | | |
|---|---|---|
| CN | 1262904 A | 8/2000 |
| JP | 5971675 | 4/1984 |
| JP | 61146172 | 7/1986 |
| JP | 0670701 | 3/1994 |

\* cited by examiner

METHODS FOR SPLITTING PISTACHIO NUTS

RELATED APPLICATIONS

This is a continuation of U.S. patent application Ser. No. 11/060,700 filed on Feb. 16, 2005, which issued as U.S. Pat. No. 7,357,952 on Apr. 15, 2008, and which is incorporated herein by this reference.

BACKGROUND OF THE INVENTION

1. Field of the Invention

The present invention relates to the methods and processes for splitting pistachios which have not opened naturally to thereby make the pistachios desirable for commercial sale.

2. Description of the Prior Art

Pistachios are the seed of a dioecious tree of the cashew family. They include an edible kernel or meat which is surrounded by a hard smooth shell which is further covered by a soft hull. In spring, the female tree produces clusters of flowers that are pollinated by the male tree. A viable embryo, or seed, is formed in each pollinated flower. Consequently, a single cluster can have up to hundreds of viable embryos. Two distinct layers protect each embryo. There is an inner layer which becomes the hard shell, and the outer layer which later becomes the soft hull. The embryo itself becomes the edible meat or kernel of the nut.

The shells of pistachios split during late stage of seed development. Shell splitting ordinarily begins around July or early August, and continues into September. Pistachio shells have a visible line or suture that runs parallel to the longitudinal axis of the shell connecting the apex of the nut to its base. This seam demarks the line of dehiscence of the pistachio shell and is where the shell naturally opens to discharge the kernel. The base is the point at which the nut is attached to the cluster. During development, nutrients are transported through the base to the embryo. The base of the pistachio nut is visually distinct. It may be up to one eight of an inch (⅛") in diameter. Its total surface area is a small fraction of the total surface area of the nut, yet it is far more porous than the rest of the shell. The natural splitting or shell detachment process in pistachios ordinarily starts at the apex of the nut and progresses along the suture toward the base.

Typically, upon arrival at a processing plant, hulls of pistachio nuts are immediately removed, and the remaining kernel and shell are dehydrated. As a result of dehydration, the kernels shrink thereby creating an air pocket within the shell. The shells of some pistachios naturally split when dehydrated, and are separated and removed from the closed-shell nuts. The closed-shell nuts then undergo further processing. The closed-shell pistachios are frequently non-symmetrical and ovoid to oblong in shape. They may be three-eighths of an inch (⅜") to three-fourths of an inch (¾") wide, and one half an inch (½") to one inch (1") long, depending on the variety.

Natural looking splits may be induced by applying external force either perpendicular to the axis of the suture in the vicinity of the apex, or parallel to the axis of the suture at either the apex or the base. An external force applied to a pistachio shell in any other direction may not split along the suture, may shatter the shell, or may induce no split at all. On the other hand, internal forces such as those generated during late stage seed development or during germination always split the shell along the suture producing natural looking splits.

The commercial salability of pistachio nuts depends in large part upon whether or not the shells are split, whether the splits look natural or induced, and the degree of splitting. A significant portion of a normal crop of pistachio nuts will remain closed even after processing. The value of closed-shell pistachio nuts is significantly less than that of the split nuts. As a result, there exists a need for efficient and reliable techniques to split unopened pistachio nuts in a uniform manner so that they resemble naturally opened nuts. However, it is important that pistachio opening processes and equipment be capable of quickly and efficiently splitting a large number of nuts, and that the process or equipment does not crack the shells of the unopened pistachio nuts other than along the sutures.

From early times through the present, pistachios have been hand split. Many hand devices are understood to be used such as pliers and the like to squeeze the nut until it splits. It has also been known in the art to soak the nuts in water. The shells of the pistachio are water permeable, and when hydrated, the shells become less brittle. After soaking, the shells are less likely to split improperly or shatter. Another traditional method involves soaking the closed shell pistachio nuts and then allowing the nuts to be dried by the sun. This method causes some of the shells to open along the suture.

A number of modern devices and processes have been devised for artificially splitting pistachios. The use of an apparatus to apply physical pressure to the shell of a pistachio to cause splitting is well known in the art. For instance, a known mechanism passes the nuts through a tapered area between a rotating conical mandrel and a concentrically arranged cylinder. The nuts must be distorted in compression to pass beyond the mandrel. This distortion is intended to split the nut artificially.

Another method has been devised which includes moisturizing the closed shell nuts to soften the shells, making them more resilient. These kinds of processes are described in U.S. Pat. Nos. 4,961,947 and 4,183,967. In the '947 patent, the pistachios with softened shells are released from a moisturizer and fed to a splitter. The nuts drop into individual cradles which are U-shaped in cross section and have an elongate axis extending between a movable splitting head and a stationary splitting jaw. The softened shells of the pistachio nuts are split by the mechanical pressure placed on the ends. Once split, the nuts are then dried and otherwise processed for sale. The description in the '967 patent differs slightly by applying pressure to the nuts with softened shells and splits the shells through the combination of the release of pressure and heat. Disadvantages remain with both of the aforementioned processes. By applying mechanical pressure, especially if the force is applied to the nut in the wrong position, the shell might not split along the suture, may shatter, or may not induce a split at all. Also, considerable time is spent soaking the shells of the nuts, typically at least an hour, thereby delaying the splitting process and requiring further drying before the nuts are ready for packing and shipment.

Another problem that arises in pistachio processing is that some nuts partially open, but not to the extent needed to be commercially valuable. The shells of such nuts separate slightly along the longitudinal suture, but not to the extent necessary for the end user to remove the kernel or meat. Conventional ways to increase the split of the shell involve soaking the nut for an extended period of time and then allowing the nut to dry. This process is very time consuming as the pistachios must be soaked for a relatively long period time to allow the shells to become hydrated, and then dried for another relatively long period of time.

It is therefore desirable to provide a process that is capable of splitting pistachio shells in a quick, efficient manner that ensures a split along the longitudinal suture of the shell. It is also desirable to provide a process that is capable of further splitting partially open pistachio shells to make them commercially marketable.

SUMMARY OF THE INVENTION

The present invention includes methods of splitting the shells of pistachio nuts by partially filling a vessel with water, introducing a plurality of closed-shell pistachio nuts into the vessel, closing the vessel, and inducing at least a partial vacuum. The vacuum or partial vacuum created by the withdrawal of air from the vessel causes air to be forced out of the closed shells. The vacuum is left in place for a relatively short period of time so that at least some air escapes from the shells, and is then removed. Since the shells are in water, the removal of the vacuum causes a small amount of water to be sucked into the shells, replacing the removed air. This takes place in a relatively short period of time, after which the closed-shell nuts are removed from the vessel and promptly subjected to microwave radiation. This causes the small amount of water inside the shells to heat up and expand (vaporize), resulting in increased pressure inside the shells, forcing them to split open. The splits occur along the suture, giving the opened nuts a natural look that is indistinguishable from those that are naturally split. In addition, the processes of the present invention are extremely simple, scalable, efficient and rapid. It is to be noted that the process of adding water to the shells through the use of a vacuum should be done in batches, but the process of irradiating the nuts may be done either in batches or as part of a continuous process.

Under the methods of the present invention, closed-shell pistachio nuts are first separated from open-shell nuts. To split the closed-shell pistachio nuts, one process of the present invention involves placing the nuts in a vessel that is partially filled with water, sealing the vessel leaving some air inside, and inducing vacuum pressure to the interior to remove some or all of the air. The shells of the nuts are slightly permeable, and the induced vacuum causes some of the air trapped inside the shells to escape. Pistachio shells are most permeable at the base which provides the path of least resistance for air (and water) to travel in and out of the closed shells. The lessened pressure within the vessel creates a relative positive pressure within the closed shells forcing air out. The pressure within the vessel is then allowed to return to normal atmospheric pressure. Because the shells are in water, the now negative pressure inside of the shells causes water to be drawn into the shells, usually through the same opening where the air escaped. It is to be noted that the pressure does not need to be reduced to the point of creating a complete vacuum to successfully introduce water to the interior of the shells. It is also to be noted that only a small amount of water is needed inside the closed shells, and that it is not necessary to fill the entire inside of the shells to introduce proper splitting, as discussed below. In fact, it is preferred not to introduce excessive water into the shell or to leave the kernels inside the shells exposed to water for very long, as this could saturate the kernel and lead to damage or unnecessary hydration.

As water enters the shell, the kernel or meat of the shell comes in contact with the water. If water is left inside the shells for an extended period of time, the shell and the kernel itself can become hydrated. Accordingly, the methods of the present invention call for the shells to be split open in a relatively short period of time after water is introduced in order to avoid hydration of the kernel or shell of the nut. Otherwise, a saturated kernel may be damaged or explode when exposed to microwave radiation. It is therefore an important object of the present invention to minimize the amount of time that the shells and kernels are exposed to water. Not only does this facilitate rapid processing of closed-shell pistachio nuts, it also avoids potential damage to the nuts themselves. Should the kernels and shells of the nuts become saturated with water, they may be taken out of the processing system and allowed to dehydrate for later processing.

It is to be appreciated that the amount of time that the closed-shell nuts should remain in the water-bath vacuum is directly related to the amount of vacuum applied (i.e., the amount of reduction in pressure per square inch), as well as the characteristics of the vessel including the security of its seal, and the level of hydration of the nuts prior to introduction. A stronger vacuum (i.e., higher differential p.s.i.) will cause air to be more rapidly sucked out of the nuts, whereas more time will be required for a lesser vacuum. Thus, it is possible to induce the necessary elimination of internal air from inside the nut shells in one minute or less with a very strong vacuum. Alternatively, this process could take about 10, 20 or even 30 minutes with lesser vacuums. Then, once the desired level of air has been removed from inside the nuts, the vacuum is removed, and water is sucked back into the nuts to replace the expelled air. It is not desirable to expose the nut kernels to this water for more than about 45 minutes without risking hydration of the kernels and resulting damage as described previously. Thus, once enough time has passed to allow the escaped air to be replaced with water (i.e. from about 1-30 minutes), the nuts should be promptly removed from the water bath.

The partially water-filled closed shells are then removed from the vessel and microwave radiation is applied to them. The radiation rapidly vaporizes the water within the shell of the nut thereby creating a swift rise in pressure inside the shell. This rapid application of internal pressure causes the shells to split along their longitudinal sutures. Once the shells are spit, the now open-shell pistachio nuts can be dried and further processed.

An important aspect of this process is the speed in which the water in the shell is vaporized to create internal pressure within the shell. As described above, closed shell pistachio nuts are permeable to water and water vapor. Therefore, it is important to increase the vapor pressure or volumetric pressure within the shell at a rate faster than the rate at which water or vapor can escape from the shell. The use of microwave radiation allows for the water to quickly be vaporized. The microwaves are readily absorbed by the water, but not the shell or kernel of the nut which remain dehydrated. Due to the rapid heating of the water from the use of microwave radiation, the shell, while slightly permeable at its base, is not capable of releasing the amount of pressure created from the water vapor and the shell is forced to split open rapidly. Before splitting, most, if not all, of the vapor pressure is lost during microwave application through the base region.

If the pistachio nut is over-hydrated, allowing the kernel of the nut to become hydrated, then the microwave radiation may act upon the water in the kernel itself, potentially causing it to explode, and therefore rendering the pistachio unmarketable. It is therefore desired that the kernel of the nut remain dehydrated, or at worst minimally hydrated during this process. Dried pistachios normally have from 4-6% moisture. Pistachios can be hydrated up to 14-16% moisture without being damaged when exposed to microwave radiation. If the kernels do become hydrated for any reason, they can be dehydrated and reprocessed without any adverse consequences.

Unlike other methods for splitting pistachios, the process described above does not rely on an external mechanical force on the nuts to cause the splitting. The process inherently has several advantages by not being limited by a physical apparatus. The nuts do not have to be sized as is needed for many machines which requires sizing so that the proper amount of force is applied to all nuts. Additionally, the above described process is extremely fast compared to methods of opening closed shelled pistachios. The process of inserting water into the shells of the pistachios takes much less time than previous methods that required soaking. The nuts are submerged during the vacuum process, but not for the extended period of time required for the nuts to become completely hydrated. Whereas soaking the nuts may take hours, the process of using vacuum pressure to fill the shells with water can be accomplished in just a matter of minutes. During the vacuum process, the nuts are exposed to water for a very short period of time (preferably 5-10 minutes) and should not be left in contact with water for longer than forty-five minutes to prevent the kernels from becoming hydrated. In the event that the nuts are left in water for a longer period of time for any reason (machine failure, operator error, etc.) the nuts can be removed, dehydrated, and the process can be started again.

It is important to cause the expansion of the water within the shell as quickly as possible after the vacuum process. As described, the shell of the nut is slightly permeable, thereby allowing water to enter the void within the shell. Since the shell is permeable, water that enters the shell of the nut can also slowly discharge over time. Therefore, to ensure that there is sufficient water within the shell of the nut to cause internal pressure, the process of microwaving the nut should occur as soon as practicable after the vacuum process. Rapid timing also assures that the nut kernel will not become hydrated during the process. Additionally, the process of irradiating the nuts with microwaves is extremely rapid, and can cause the splitting of nuts within less than forty-five (45) seconds. The kernels can be cooked if left exposed to microwave radiation for longer than forty-five seconds.

In an alternative embodiment, water can be trapped within the shell from simply soaking the nuts in water for an extended period of time rather than through the use of vacuum pressure as described above. The nuts should be soaked for a long enough period of time to allow enough water to diffuse inside the shell without substantially hydrating the kernels. Substantially hydrating the kernels can lead to damage, as describe previously. In this embodiment, water diffusion occurs from outside in, first affecting the shells, and only affecting the kernels if left to soak for too long. Thus, the closed-shell nuts are allowed to simply soak for a long enough period to allow some water to permeate through the shell to the inside, ordinarily about an hour, but generally not for more than about two hours. This allows the kernels to remain largely dehydrated. When the shells reach an appropriate level of hydration, they are exposed to microwaves as above. The water that has permeated into the shells reacts, creating pressure within the shells and forcing the shells to split open.

In another alternative embodiment, instead of vaporizing the water trapped in the shell, the water can be rapidly cooled. Such rapid cooling causes the volume of the water to increase as it is frozen within the shell. The water within the shells is rapidly frozen by the use of an extremely cold solution such as liquid nitrogen or an ethanol-dry ice solution. It is to be noted that any method of rapid freezing other than the use of a super-cooled solution is also contemplated by this invention. The rapid freezing of the water within the nuts causes the expansion of the water as it turns to ice, and the pressure from such expansion causes the shell to split open along the longitudinal suture. The water within the nuts can be frozen extremely quickly, usually within one (1) minute. After the shells are split by the internal pressure created by the rapid formation of ice within the shells, the now open-shell pistachios are dehydrated and further processed for sale. During this process hydrated kernels may be damaged. If the kernel is hydrated, then the kernel can freeze. When frozen, the texture and flavor of the nut may change and the nuts become less valuable. Therefore, it is still important to keep the kernels from becoming hydrated before the nuts are exposed to the very cold temperatures described in this embodiment.

Other aspects of the invention are methods and processes for enhancing the degree of splitting pistachio nuts. Some pistachio nuts are slightly open, yet not enough for commercial sale. Therefore the split of the shell must be enhanced. This aspect calls for the use of steam to hydrate the pistachio nut shells. With the application of steam, the shells can become hydrated within a short period of time, as short as a couple of minutes. After the application of the steam, the nuts are quickly dehydrated, which causes the splits of the partially-open shells to be enhanced.

It is therefore a primary object of the present invention to provide rapid and efficient methods to split open closed pistachio nut shells through artificial means.

It is also an important object of the present invention to provide a process for splitting closed shell pistachio nuts without hydrating either the shell or the kernel of the nut to prevent any damage thereto.

It is a further object of the present invention to provide a process for splitting closed shell pistachios without having to sort and size the nuts.

It is a further object of the present invention to provide a process to further enhance the split of a pistachio nut in an expeditious manner.

Additional objects of the invention will be apparent from the detailed descriptions and the claims herein.

DETAILED DESCRIPTION

The disclosed processes or methods for splitting nuts are one step in the processing of pistachio nuts for sale. For example, with pistachio nuts, the nuts are first collected and hulled to reveal the nut shell. Next, the closed-shell pistachio nuts are separated from the open-shell nuts, since the open-shell nuts are immediately marketable. The closed-shell nuts are then processed without sorting for size. The process is initiated by placing the closed-shell nuts in a sealable vessel or tank along with water. After the nuts are placed in the vessel it is sealed, leaving at least some volume of air inside. Some or all of this air is removed then from the vessel, thereby reducing the pressure inside the vessel, and creating a slight vacuum. While negative pressure must be induced in the vessel, a complete vacuum is not required. The amount of vacuum pressure required will depend on a number of factors. The pressure must be decreased more for larger batches. In addition, the required level of vacuum pressure is also dependent on the atmospheric pressure, which itself will vary based on elevation, weather, or temperature. It is estimated that a negative pressure of 15 to 25 pounds per square inch (PSI) is usually adequate. The reduced air pressure causes air to escape from inside the closed shells. After a given time interval (e.g. about 5 minutes for a strong vacuum), a sufficient amount of air is removed from the closed shells. The pressure within the container is ten allowed to return to atmospheric pressure causing the shells to fill with water to replace the removed air. The entire shell does not need to become filled with water for the process to work properly. In order to accomplish the replacement of extracted air with water, the nuts should remain in the water for a time interval of between about 5 minutes and about forty-five (45) minutes. If the nuts are submerged in water for a longer period of time, the kernels may become permeated and subject to damage in the next step. If so, the nuts can be dehydrated, and the process can be initiated again.

The shells that now have a small amount of water in them are then promptly removed and subjected to microwave radiation. To prevent substantial hydration of the shell and particularly the kernel of the nut, the nuts should be expeditiously removed from the water-filled vessel and exposed to the microwave radiation. It is preferable that the nuts be exposed to the microwave radiation within about thirty (30) minutes after the vacuum has been released.

The microwave radiation rapidly vaporizes the water within the shell of the nut thereby creating a rapid rise in pressure inside the shells. This rapid application of internal pressure causes the shell to split along its longitudinal suture. Microwave radiation should be applied to the nuts for no longer than about forty-five (45) seconds to create the internal pressure to force the nuts to split. Preferably, the nuts need only be exposed to microwave radiation for a period of about 25 to about 35 seconds to be split. If excessive microwave radiation is applied, the kernel of the nut can be damaged or cooked, which is undesirable for sale of natural nuts. Likewise, if the kernel itself has become hydrated, the microwave radiation could cause it to explode. Once spit, the now open-shell pistachio nuts can be dried and further processed for sale.

In an alternative embodiment, instead of vaporizing the water trapped in the shell, this water can be rapidly cooled. The water within the nuts may be rapidly frozen by the use of a refrigeration system, or an extremely cold solution such as liquid nitrogen or an ethanol-dry ice solution. The water within the nuts should be frozen quickly, usually in a matter of seconds, but in any event less than one minute. Longer freezing times will not damage the nuts but will increase the process time and the process cost. The increased volume of the ice formed inside the shells increases the pressure inside the shells, inducing them to split open. After the shells are split by this rapid formation of ice, the now-open shell pistachios may be dehydrated and further processed for sale.

An alternative embodiment of the invention is a method and process for enhancing the degree of splitting pistachio nuts. This process requires the use of steam to hydrate the pistachio nut shells. It is desired that steam is applied to the nuts for 1 to 2 minutes to hydrate the shells of the nuts. After the application of the steam the nuts can be dehydrated quickly, within 1 to 2 minutes, and through such process the split of the partially split pistachios will be enhanced. Process times can be extended to for up to 5 minutes or more for each step of the process, without significant damage. Disadvantages of the extra processing time are the additional time and additional costs involved. Since no vacuum pressure is required for this process, it is capable of being done in either batches or a continuous process if desired.

It is to be appreciated that different embodiments of the described process or method can be created from different combinations of the various steps described above, including without limitation different combinations of time intervals for both the application of the vacuum, and soaking after removal of the vacuum. It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. A method for splitting a plurality of nuts comprising:
   a. introducing said plurality of nuts and an aqueous fluid into a sealable vessel, wherein each of said plurality of nuts have closed shells;
   b. sealing said vessel;
   c. locating said fluid between inside surfaces of said shells and kernels of said nuts by removing an amount of air from said vessel, waiting for a first time interval, reintroducing at least a portion of said amount of air back into said vessel, and waiting for a second time interval; and
   d. inducing increased pressure on said inside surfaces of said shells to split said shells along lines of dehiscence by rapidly decreasing the temperature of said located fluid.

2. The method of claim 1 wherein said first time interval is between about 20 minutes and about 30 minutes.

3. The method of claim 1 wherein said first time interval is between about 10 minutes and about 20 minutes.

4. The method of claim 1 wherein said first time interval is between about one minute and about 10 minutes.

5. The method of claim 1 wherein said first time interval less than about one minute.

6. The method of claim 1 wherein said second time interval is between about 10 minutes and about 45 minutes.

7. The method of claim 1 wherein said second time interval is between about 5 minutes and about 10 minutes.

8. The method of claim 1 wherein said second time interval is less than about five minutes.

9. The method of claim 1 wherein said increased pressure is induced within about 30 minutes after said plurality of nuts are introduced into said vessel.

10. The method of claim 1 wherein said step of rapidly decreasing the temperature of said located fluid is caused by exposing said plurality of nuts to a super-cooled solution.

11. The method of claim 10 wherein said plurality of nuts are exposed to said super-cooled solution for a period of less than about one minute.

12. The method of claim 10 wherein said super-cooled solution comprises liquid nitrogen.

13. The method of claim 10 wherein said super-cooled solution comprises an ethanol-dry ice solution.

14. The method of claim 10, wherein said step of exposing said plurality of nuts to said super-cooled solution comprises the steps of removing said plurality of nuts from said sealable vessel and depositing them into a second vessel comprising said super-cooled solution.

15. The method of claim 10, wherein said step of exposing said plurality of nuts to said super-cooled solution comprises the step of depositing said super-cooled solution into said sealable vessel.

16. The method of claim 10, wherein said step of exposing said plurality of nuts to said super-cooled solution comprises the step of continuously moving said plurality of nuts into and thereafter out of said super-cooled solution.

17. The method of claim 1 further comprising the step of dehydrating said plurality of nuts after said shells are split.

18. The method of claim 1, wherein said step of rapidly decreasing the temperature of said located fluid is caused by continuously moving said plurality of nuts into and thereafter out of a sufficiently cold environment.

19. The method of claim 1, wherein the bases of said nuts remain substantially intact after said shells are split.

20. A method for splitting a plurality of nuts comprising:
a. partially filling a vessel with an aqueous fluid;
b. introducing said plurality of nuts into said vessel, wherein each of said plurality of nuts have closed shells;
c. closing said vessel;
d. reducing the pressure in said vessel to below atmospheric pressure by withdrawing air therefrom;
e. leaving said vacuum in place for a first time interval;
f. allowing said pressure in said vessel to equalize to atmospheric pressure;
g. waiting a second time interval before removing said plurality of nuts from said vessel; and
h. splitting said shells along lines of dehiscence by exposing said plurality of nuts to a sufficiently cold environment for a third time interval.

21. The method of claim 20 wherein said first time interval is between about 20 minutes and about 30 minutes.

22. The method of claim 20 wherein said first time interval is between about 10 minutes and about 20 minutes.

23. The method of claim 20 wherein said first time interval is between about one minute and about 10 minutes.

24. The method of claim 20 wherein said first time interval is less than about one minute.

25. The method of claim 20 wherein said second time interval is between about 10 minutes and about 45 minutes.

26. The method of claim 20 wherein said second time interval is between about five minutes and about 10 minutes.

27. The method of claim 20 wherein said second time interval is between about one minute and about five minutes.

28. The method of claim 20 wherein said third time interval is less than about one minute.

29. The method of claim 20 wherein said plurality of nuts are exposed to said sufficiently cold environment within about 30 minutes after being introduced into said vessel.

30. The method of claim 20 wherein said step of exposing said plurality of nuts to a sufficiently cold environment comprises introducing said plurality of nuts to a super-cooled solution.

31. The method of claim 30 wherein said super-cooled solution comprises liquid nitrogen.

32. The method of claim 30 wherein said super-cooled solution comprises an ethanol-dry ice solution.

33. The method of claim 20 wherein said third period of time is between about 17 seconds and about 45 seconds.

34. The method of claim 20, wherein the bases of said nuts remain substantially intact after said shells are split.

35. A method for splitting a plurality of nuts comprising:
a. first exposing said plurality of nuts to water for a first period of time, wherein each of said plurality of nuts have closed shells; and
b. thereafter splitting said shells along lines of dehiscence without shattering said shells by exposing said plurality of nuts to a sufficiently cold environment for a second period of time, wherein said second period of time corresponds to an amount of time necessary for said water to expand and impart an outward force on inner surfaces of said shells.

36. The method of claim 35 wherein said first period of time is less than about one minute.

37. The method of claim 35 wherein said first period of time is between about one minute and about 30 minutes.

38. The method of claim 35 wherein said first period of time corresponds to an amount of time necessary for said kernels of said plurality of nuts to reach a hydration level of between about 8% and about 16%.

39. The method of claim 35 wherein said second period of time is less than about 45 seconds.

40. The method of claim 35 wherein said second period of time is between about 25 seconds and about 35 seconds.

41. The method of claim 35, wherein said sufficiently cold environment comprises a super-cooled solution.

42. The method of claim 41, wherein said step of exposing said plurality of nuts to said sufficiently cold environment comprises the step of depositing said super-cooled solution into a vessel containing said plurality of nuts.

43. The method of claim 41, wherein said step of exposing said plurality of nuts to said sufficiently cold environment comprises the step of depositing said plurality of nuts into a vessel containing said super-cooled solution.

44. The method of claim 35 wherein said second period of time is between about 17 seconds and about 45 seconds.

45. The method of claim 35, wherein the bases of said nuts remain substantially intact after said shells are split.

46. A method for splitting the shell of a nut comprising the step of rapidly reducing the temperature of a fluid located between said shell and a kernel of said nut at about constant pressure, wherein said reduction in temperature causes said fluid to expand and split said shell along a line of dehiscence, and wherein the base of said nut remains substantially intact.

47. The method of claim 46, further comprising the sequential steps of:
a. introducing said nut and said fluid into a vessel; and
b. inducing at least a partial vacuum in said vessel.

48. The method of claim 46, further comprising the sequential steps of:
a. removing said nut from said vessel; and
b. dehydrating said nut until said nut reaches a hydration level of between about 4-6%.

49. The method of claim 46, wherein said temperature of said nut is rapidly reduced by exposing said nut to a super-cooled solution for a period of time necessary for said fluid to transition to a solid state.

50. A method for splitting the shell of a nut comprising the steps of:
a. locating water between said shell and a kernel of said nut while maintaining the hydration levels of said shell and said kernel; and
b. at about constant pressure, rapidly freezing said located water by exposing said nut to a super-cooled solution, wherein said frozen water expands and splits said shell along a line of dehiscence.

51. The method of claim 50, wherein said step of locating said fluid comprises the steps of:
a. placing said nuts and said water in a vessel at atmospheric pressure;
b. reducing the pressure in said vessel to below atmospheric pressure; and
c. allowing the pressure in said vessel to return to atmospheric pressure.

* * * * *